United States Patent [19]

Pryor et al.

[11] Patent Number: 5,069,570
[45] Date of Patent: Dec. 3, 1991

[54] SNUBBER FOR TELESCOPING TUBES

[75] Inventors: John W. Pryor, Encinitas; Jeffrey W. Pryor, Vista, both of Calif.

[73] Assignee: Pryor Products, Oceanside, Calif.

[21] Appl. No.: 497,689

[22] Filed: Mar. 23, 1990

[51] Int. Cl.[5] ............................................. F16B 7/10
[52] U.S. Cl. .................................. 403/109; 403/104; 403/377
[58] Field of Search ........ 403/109, 203, 243, 258–259, 403/372, 377, 104, 105

[56] References Cited

U.S. PATENT DOCUMENTS

| | | | |
|---|---|---|---|
| 534,742 | 2/1895 | Flynn | 248/336 |
| 969,641 | 10/1910 | Laughlin et al. | 16/84 |
| 1,447,519 | 3/1923 | Schade | 403/105 X |
| 1,871,668 | 8/1932 | Dawson | 403/377 X |
| 1,996,537 | 4/1935 | Carlson | 16/84 |
| 2,044,865 | 6/1936 | Van Arsdale | 16/84 |
| 2,172,549 | 9/1939 | Solomon | 403/109 X |
| 2,209,733 | 7/1940 | Jones | 16/84 |
| 2,614,770 | 10/1952 | Gabrielson | 403/109 X |
| 2,664,259 | 12/1953 | Rose | 403/109 X |
| 3,260,515 | 7/1966 | Albers | 267/1 |
| 3,278,979 | 10/1966 | Clement | 16/66 |
| 3,506,287 | 4/1970 | Lampert | 403/104 |
| 3,555,591 | 1/1971 | Sogoian | 16/49 |
| 3,737,136 | 6/1973 | Snurr | 403/109 X |
| 3,741,514 | 6/1973 | Snurr | 403/377 X |
| 3,990,542 | 11/1976 | Dent et al. | 16/82 X |
| 4,016,960 | 4/1977 | Wilcox | 188/282 |
| 4,079,479 | 3/1978 | Clement | 16/66 |
| 4,382,311 | 5/1983 | Watts | 16/66 |
| 4,679,261 | 7/1987 | Stanley et al. | 403/109 X |
| 4,815,163 | 3/1989 | Simmons | 16/49 |
| 4,852,862 | 8/1989 | Bauer et al. | 267/120 |
| 4,895,471 | 1/1990 | Geltz et al. | 403/109 X |
| 4,896,687 | 1/1990 | Segal et al. | 403/109 X |

Primary Examiner—Peter M. Cuomo
Assistant Examiner—Heather Chun
Attorney, Agent, or Firm—Brown, Martin, Haller & McClain

[57] ABSTRACT

A snubber which inhibits coaxial movement in one direction and prevents shock in a collapsing telescopic pole comprises an outer tube, an inner tube containing an attached end-piece positioned within the outer tube and freely movable coaxially, and a friction snubber, comprising a flexible washer and a fastener device which secures the washer to the end-piece and simultaneously adjusts the expansion of the washer to regulate pressure of the washer against the inner surface of the outer tube.

7 Claims, 1 Drawing Sheet

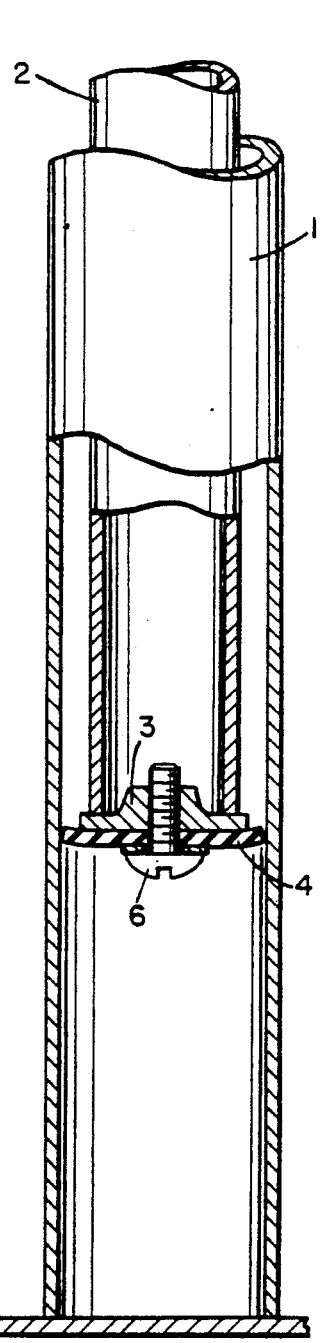
FIG. 1
FIG. 2
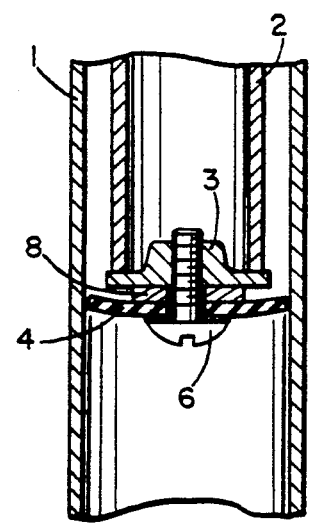
FIG. 3
FIG. 4

SNUBBER FOR TELESCOPING TUBES

BACKGROUND OF THE INVENTION

1. Field of the Invention

This invention relates to devices which prevent shock caused by collision after rapid coaxial movement or collapse of telescoping members of a support structure, particularly to devices which do not function solely on a pneumatic principle.

2. Description of the Prior Art

Several methods, have been advanced to regulate the relative movement of collapsing telescopic structures. Earlier devices generally often employed a spring loaded or friction latch device to prevent the tubes from collapsing under load. More recent devices may incorporate pneumatic principles, as in automobile shock absorbers, or door closing devices.

Important considerations in the design of shock absorbing devices or snubbers to reduce shock to fragile objects being supported on telescoping structures are capacity to absorb shock, weight, smoothness of operation, safety and effect on appearance. Other prevailing considerations are cost of manufacturing, and, especially in the case of support devices for the medical patient care, such as intravenous fluid bag support stands, reliability. The latter consideration is facilitated in designs that incorporate fewer component parts.

Shock absorbing contrivances of various designs are available commercially, but none have all of the desireable features stated above.

U.S. Pat. No. 2,664,259, issued to Rose describes a hanger which utilizes both frictional and pneumatic forces for vertical adjustment of an object mounted under a suspended telescoping support. The position of the object is adjusted and maintained by an exterior friction clamp comprised of a base plate, containing an aperture through which a coaxial rod passes, affixed to the outer tube, and another plate with a slightly larger aperture, which is spring-loaded on an obtuse angle to the first plate. While releasing the clamp to adjust position, the suspended article may be lowered at a speed controlled by a pneumatic device comprising a leather cup such as is found in a tire pump mechanism.

U.S. Pat. No. 1,447,519, issued to Schade, describes a friction clutch for telescoping elements. The several embodiments described can be activated by various remote means, while the effective gripping part is carried by the inner telescopic element and is movable to project outwardly to operate against the inner circumference of the outer telescopic element. Friction is the only operative force used.

A very complex, linearly adjustable device fixable by a locking mechanism is described by Lampert in U.S. Pat. No. 3,506,287. This device utilizes friction forces alone.

It is therefore desirable to have a device which overcomes the deficiencies of prior art apparatus in a device that is simple, reliable and effective.

SUMMARY OF THE INVENTION

An exemplary embodiment of the invention is described which provides a simple, effective and inexpensive means to control movement of telescoping tubes in at least one direction. Application of the invention to reduce shock to an object caused by gravitationally induced collapsing of a telescopic pole support. An advantage of the present invention is the control of co-axial movement in telescoping members by allowing unrestricted movement in one direction and restricting movement by means of friction, compressed air and vacuum in the opposite direction.

In accordance with the present invention, a snubber is provided which is capable of utilizing friction, compressed air and vacuum forces acting in concert to control movement in at least one direction and thereby limit shock to a load carried by a collapsing telescopic pole. The snubbing mechanism comprises an outer tube, a telescoping coaxial inner tube which contains an end-piece, and an adjustable friction mechanism, comprising a flexible washer and means for affixing the washer to the end-piece of the tube and simultaneously adjusting pressure against the inner surface of the outer tube.

The flat top and bottom surface areas of the flexible washer are larger than the effective surface area of the end-piece. The surface area of the end-piece is in turn larger than the surface area of the means affixing the flexible washer to the end-piece. This configuration results in deflection of the flexible washer as the inner tube is extended out of the outer tube, and frictional engagement of the washer with the inner surface of the outer tube as the inner tube is telescopically collapsed back into the outer tube.

BRIEF DESCRIPTION OF THE DRAWINGS

FIG. 1 is a pictorial view showing a telescopic post in a typical use.

FIG. 2 is an enlarged sectional view taken on line 2—2 of FIG. 1.

FIG. 3 is a similar sectional view showing adjustment action.

FIG. 4 shows alternate frictional washer arrangement.

DETAILED DESCRIPTION OF THE PREFERRED EMBODIMENT

In accordance with the present invention, the telescopic tubes may be of varying length and cross-sectional configuration.

FIG. 1 presents a pictorial view of an intravenous infusion support system (I.V. pole), which especially benefits from the use of the snubbing system in accordance with the invention.

As depicted in the enlarged sectional view in FIG. 2, the elements cooperating to constitute a snubbing effect are an outer tube 1, an inner tube 2, an end-piece 3 affixed to one end of the inner tube, a flexible washer 4 and screw 6 (comprising means to retain the washer on the end-piece and adjust its outer diameter to achieve the required frictional force against the inside surface of the outer tube).

In the exemplary embodiment the outer tube 1 forms the base or (non-movable) part of a telescoping IV bottle support stand. The tube is affixed to a base, shown generally as a flat plate 7, which provides a larger footprint for stability. In other applications, the base may comprise a frame with legs with or without castered wheels, for example. The end of tube 1 affixed to the plate 7 is sealed air-tight, such as by welding around the periphery. A suitable locking mechanism of a standard type as used in IV stands will be provided for locking the tubes in the desired adjusted position. The snubbing system regulates the relative movement of the tubes when the locking mechanism is released, as explained in more detail below. The inside surface of the tube must be of uniform diameter along the portion of traversed by the inner tube 2, and must be smooth, without nicks or burrs which would abrade the washer 4 or interfere with its seal against the inner wall.

The inner tube 2 has an outside diameter slightly smaller than the inner diameter of the outer tube 1, allowing free coaxial movement of the tubes relative to each other. There is an end-piece 3 attached to the end of the inner tube closest to the fixed end of the outer tube. This end-piece advantageously may be a weld nut welded to the inner tube end. Alternatively, a nut may be threaded and screwed to the inner tube, pressed on, glued or otherwise affixed. The diameter of the end-piece 3 is less than the diameter of the outer tube 1, but may be larger than the diameter of the inner tube 2.

The operational member of the snubber mechanism is the flexible washer 4. This is a flapper-type washer made from compliant flexible materials. Urethane or neoprene have been found to be especially suited to the practice of the invention. The diameter of the washer is substantially the same as the internal diameter of the outer tube 1, and is larger than the diameter of the end-piece 3 of the inner tube 2. The washer is positioned against the end-piece and is unattached to the end-piece except by the fastening means 6.

The fastening means 6 is a screw with a large diameter head in the preferred embodiment. It can, however, be a stud emanating from the end-piece, a rivet or a spring-loaded retention device with a large diameter head. The head diameter of the fastening means must be smaller than the end-piece diameter to allow for flexing of the washer away from the inner tube on the upstroke, as seen in FIG. 3.

In an alternative embodiment, as depicted in FIG. 4, a spacer washer 8 is positioned between the end-piece 3 and the flexible washer 4. The imposition of the spacer washer increases the amount of flex and the degree of adjustment which may be achieved by tightening the screw 6.

EXAMPLE

The preferred embodiment is shown incorporated in a telescoping intravenous feeding support stand (I.V. pole) to illustrate the mode of operation of this invention.

The I.V. may be positioned at the bedside of a bedridden patient. When empty, less energy is required to raise than to lower the inner tube 2 of the pole than with conventional frictional snubbers. This is due to the unique action of the snubber mechanism employed in this invention. When the inner tube is raised, the flapper washer 5 bends downwardly, as seen in FIG. 3, reducing its diameter and consequently friction against the inner surface of the outer tube 1. Air is allowed to rush past the collapsed washer 5, reducing the vacuum effect of the upward swing. Compressed air trapped below the washer 5 also exerts appreciable upward force. Therefore, the effort necessary for upward motion is markedly reduced.

On the downward stroke, the flapper washer 4 is forced upward against the end-piece 3 of the inner tube 2, and is forced against the inner surface of the outer tube 1, as illustrated in FIG. 2, to form an effective seal, limiting the volume of air that can pass. The washer 4 engages the end-piece 3 each time the inner tube is forced downward, preventing the washer from collapsing into the flexed, concave orientation illustrated in FIG. 3 and forcing it to assume the less bent orientation illustrated in FIG. 2 in which only the small outer peripheral rim outside the periphery of end-piece 3 is flexed, so that more force is required to collapse the inner tube than to extend it. The diameter of the end piece is large enough to limit bending of the washer when the inner tube is pushed down, as illustrated in FIG. 2, whereas when the inner tube is pulled upwards, there is nothing other than the head of screw 6 to prevent the washer from bending downwards, in a direction away from end piece 3, as illustrated at 5 in FIG. 3. There are three forces involved in the snubbing action as the tube is collapsed. The first is the frictional force of the washer against the inner surface of the outer tube 1, which will be greater as the tube is collapsed (FIG. 2) than when it is expanded (FIG. 3) due to the larger surface of the washer engaging the tube inner surface. The second force involved is the force due to compression of the air trapped in the tube on the downward stroke, which resists downward movement or collapsing of the inner tube. The third force is due to the partial vacuum achieved as the inner tube is expanded, due to the close tolerances at the outer end of the pole. Together, the three forces form an effective cushion against a collapsing pole. The cushioning effect may be tuned to compensate for tube tolerance variations by increasing or decreasing pressure on the flapper washer by means of the fastening means 6.

While the present invention has now been described in terms of certain preferred embodiments, and exemplified with respect thereto, one skilled in the art will readily appreciate that various modifications, changes, omissions and substitutions may be made without departing from the spirit thereof. It is intended, therefore, that the present invention be limited solely by the scope of the following claims.

What is claimed is:

1. A snubber assembly for restricting coaxial movement of telescoping tubes, said assembly comprising:

inner and outer telescoping tubes movable relative to one another in a first, tube expanding direction to expand said tubes and in a second, tube collapsing direction opposite to said tube expanding direction to collapse said tubes;

a rigid end piece having a flat outer end surface secured to an internal end of the inner tube within the outer tube;

a washer of flexible material having a cross-sectional area substantially equal to the cross-sectional area of the outer tube, the washer being attached to the outer end surface of the end piece and having an outer peripheral edge contacting the inner surface of the outer tube when the washer is unflexed, the cross-sectional area of the washer being larger than the cross-sectional area of the end piece so that a peripheral rim area of the washer projects outwardly from the outer periphery of the end piece; and securing means for rigidly securing a central area only of said flexible washer to the outer end surface of said end piece, said control area being of smaller area than the end surface area of said end piece, and leaving the remaining area of said washer outside said central area free and unsecured;

said securing means comprising means for allowing flexing of said remaining, unsecured area of said washer comprising the entire washer area outside said central, rigidly secured area away from said end piece in a first direction when said tubes are moved relative to one another in said tube expanding direction, and said end piece comprising means for allowing flexing of the peripheral rim area only of said washer outside the periphery of said end piece in a second direction opposite to said first direction when said tubes are moved relative to one another in said tube collapsing direction, said peripheral rim area of said washer being smaller than said remaining, unsecured area.

2. A snubber as described in claim 1, wherein said outer tube is affixed to a stationary base member.

3. A snubber assembly as claimed in claim 1, wherein said end piece and washer each have a central opening and said securing means is a screw having a shaft projecting through said openings and a head at one end of the shaft having a flat inner surface for bearing against said central area of said washer to retain said central area against said end piece outer surface, said flat inner surface having an area smaller than that of the outer surface of said end piece.

4. A snubber as described in claim 1 wherein a spacer is installed between said flexible washer and said inner tube end piece.

5. A snubber assembly as claimed in claim 4, wherein said spacer has a flat opposite end faces contacting said end piece and said flexible washer, respectively, each end face having a surface area smaller than the area of said outer end surface of said end piece of said inner tube, and larger than said central area of said flexible washer rigidly secured to said end piece via said securing means.

6. A snubber as described in claim 1, wherein said flexible washer is a flat discshaped member and comprised of material selected from the group of neoprene and urethane.

7. The assembly as claimed in claim 1, wherein the washer comprises a flat, planar member.

* * * * *

UNITED STATES PATENT AND TRADEMARK OFFICE
CERTIFICATE OF CORRECTION

PATENT NO. : 5,069,570

DATED : December 3, 1991

INVENTOR(S) : John W. Pryor and Jeffrey W. Pryor

It is certified that error appears in the above-identified patent and that said Letters Patent is hereby corrected as shown below:

Column 4, Line 60, "control" should read --central--.

Signed and Sealed this

Twenty-fifth Day of May, 1993

Attest:

MICHAEL K. KIRK

*Attesting Officer*   Acting Commissioner of Patents and Trademarks